Figure 5:
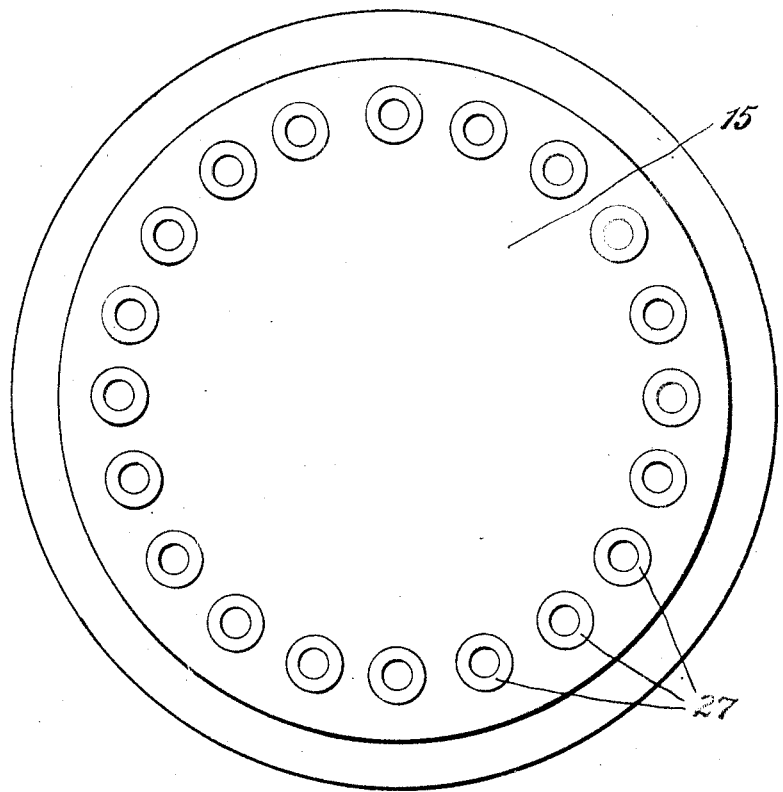

Feb. 7, 1933.    T. POHL    1,896,328
ELECTRICAL TRANSFORMER FOR SPECIAL PURPOSES
Filed Feb. 27, 1930    3 Sheets-Sheet 1
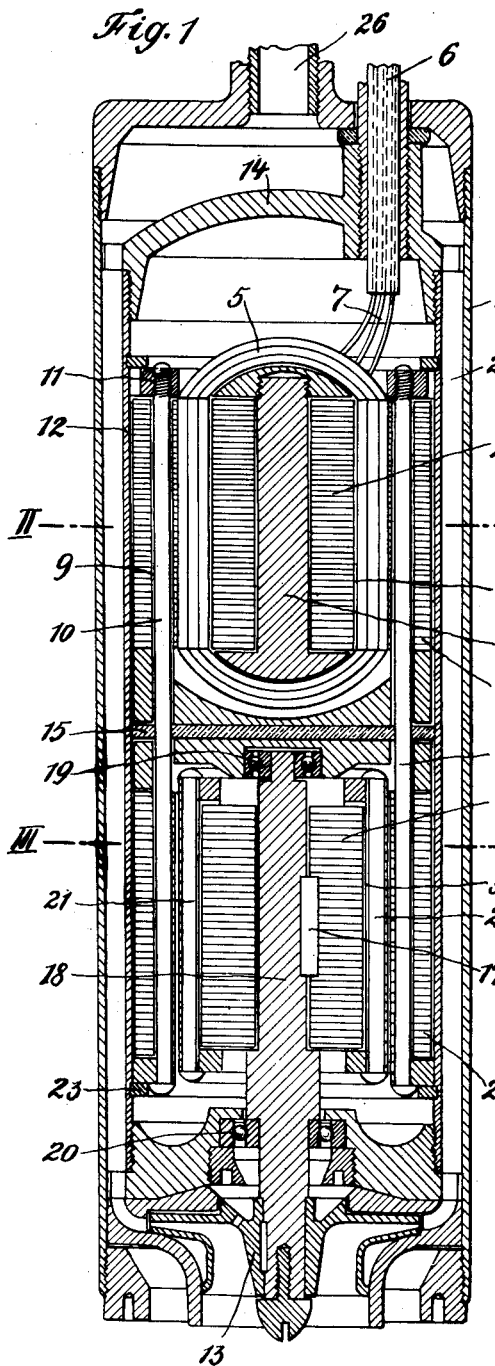
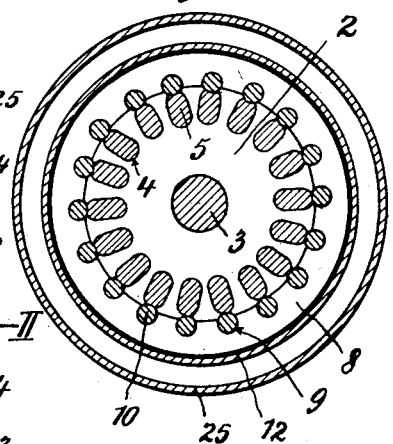
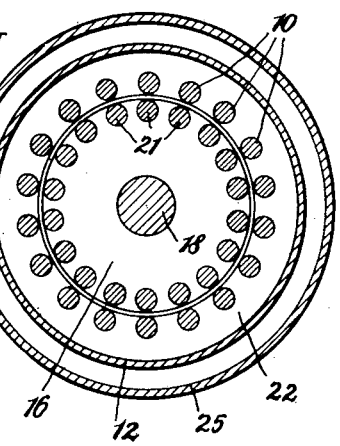
Inventor:
Theodor Pohl
Marks & Clerk
Attorney

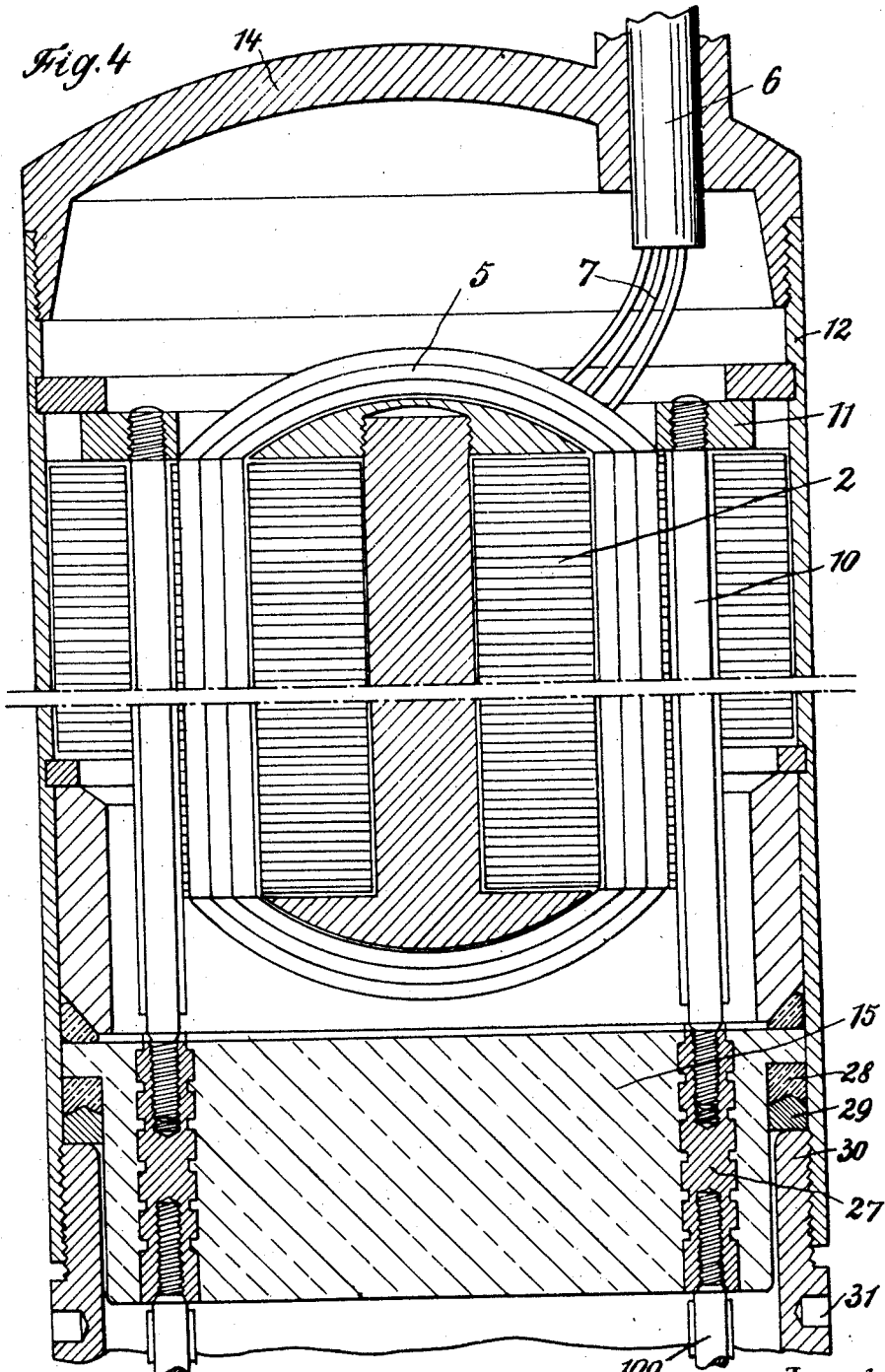

Patented Feb. 7, 1933

1,896,328

UNITED STATES PATENT OFFICE

THEODOR POHL, OF WRIEZEN (ODER), GERMANY, ASSIGNOR TO FRIDA FRANKE, OF BERLIN-WILMERSDORF, GERMANY

ELECTRICAL TRANSFORMER FOR SPECIAL PURPOSES

Application filed February 27, 1930, Serial No. 431,899, and in Germany February 26, 1929.

This invention relates to transformers, and more particularly to polyphase transformers designed for special purposes, such as for instance, for supplying electrical energy to an electric motor working under water or to an induction furnace. In apparatus of this kind as known care must be taken that no parts of the plant which are in immediate electrical connection with the mains come in contact with the water or, as the case may be, are exposed to the heat developed by the induction furnace. For this purpose the following arrangement had been proposed: A transformer had been inserted between the mains and the electric motor working under water this transformer had been connected with its primary winding to the mains, while the secondary winding had again been used as the primary for the motor to be driven; in this case, furthermore a watertight and gastight hood had been provided intermediate the primary and the secondary of the transformer. The employment of such a hood, however, will increase the distance between the primary and the secondary of the transformer to such an extent, that the efficiency of the transformer will be greatly reduced. Moreover, if this hood is made of metal it will act itself as a veritable electrical induction furnace. Making this hood of a non-metallic material, however, would hardly come into question for practical reasons.

My invention now has for its principal object to attain a watertight and gastight closure between the transformer and the motor or furnace supplied therefrom without the use of any packing in the form of a hood, jacket or the like between the primary and secondary of the transformer. By my invention, therefore, the result is obtained that the efficiency of the transformer will in no way be reduced.

According to my invention I attain this by constructing the secondary of the transformer in the generally well-known manner of a cage-winding, such as is widely used in connection with rotors for short-circuit induction motors and by arranging the several bars of said cage-winding in a manner to be insulated against each other and carrying said bars gastight through the casing which fully encloses the transformer or also connecting said bars to contact which are inserted gastight and insulated against each other into the wall of said casing to permit access to said contacts from the outside of the transformer. In this manner the cage-winding may be made to project from the transformer casing towards the outside and the ends of the several bars of said cage-winding may be connected to a short-circuit ring. If, for instance, the short-circuit rotor of an induction-motor is arranged within the cage-winding, to project likewise from the transformer casing, the rotary magnetic field which is induced in the cage-winding will act as the field of an induction motor and cause rotation of the latter with said rotary magnetic field. Since the projecting part of the cage-winding which with respect to the induction motor will act as the primary winding thereof as well as the rotor of said motor are closed upon themselves, the maximum values of the voltage induced intermediate the several bars will be extremely small, so that a motor of this kind, as known, may well be operated under water.

In the accompanying drawings I have represented a number of examples of a transformer constructed according to my invention, Fig. 1 being a longitudinal section through a pump which works under water and is driven by electric power, said pump being connected according to my invention with a transformer of the enclosed type, Fig. 2 a transverse section through the transformer along line II—II of Fig. 1, and Fig. 3 a transverse section through the motor of Fig. 1, Fig. 4 a longitudinal section, partly in view, showing a construction in which the interrupted ends of the secondary or cage-winding are conductively connected with contacts mounted gastight and watertight in the wall of the transformer permitting electrical connections to be made on said contacts on the outside of the transformer, and Fig. 5 a bottom-view of a plate carrying said contacts and serving simultaneously as a wall for the transformer casing.

The inner core of the transformer is made up, as usual, from laminated iron and designated with the reference numeral 2 in Figs. 1 and 2 of the drawings. The several laminæ of this core are mounted upon a carrier or support 3 of double-T shaped cross-section and are provided with slots 4 carrying the primary winding 5 of the transformer. The primary winding 5 may be connected with the mains by means of leads 7 passing through a stuffing box 6. An outer core 8, preferably made up likewise from laminated iron, is laid closely around the periphery of the laminated inner core 2, said outer core 8 being likewise provided with slots 9 having, for instance, a circular cross-sectional conformation. The bars 10, preferably of copper, are carried within said slots 9, and the upper ends of said bars are connected to a ring 11, for instance by means of screws, said ring serving as a short-circuit ring which connects the ends of said bars conductively with each other. The whole structure so far described is enclosed by the jacket 12, preferably of cylindrical conformation, the upper end of said jacket being closed by the cap 14, through which the above mentioned stuffing box is inserted, said stuffing box serving for the passage of the leads or cables 7 through said cap 14 into the interior of the transformer.

As may further be seen from Fig. 1, the bars 10 which form part of the secondary winding of the transformer are extended downwardly and project quite considerably from the core 2 of the transformer. The bars 10, moreover, are carried gastight and watertight through a plate 15 which is positioned at the under end of the primary winding 5. This separating plate 15—against which each of the bars 10 is insulated, if the plate itself is not made from an insulating material—forms a gastight and watertight closure against the jacket 12. As a result of the fact that the several bars 10 are carried also gastight and watertight through the plate 15, the entire transformer, and especially all parts thereof which are in immediate electrical connection with the mains, will be fully enclosed and protected.

In the construction shown in Figs. 1, 2 and 3 in which the transformer serves as an inductive coupling between the electric motor and the pump, the several bars 10 which form part of the secondary winding of the transformer project downwardly to such an extent that they will fully surround and enclose the short-circuit rotor of an electric motor. This rotor is composed of a core 16 consisting of laminated iron fixed by means of a key 17 to the shaft 18 which, for instance, may be mounted in ball-bearings 19 and 20. The under end of the shaft 18 is connected with the pump-body 13 which is not described in detail herein as it does not form an essential part of my present invention. The core 16 is provided in the usual manner with slots 32 carrying the bars 21 of which the cage-winding for the rotor is composed. The construction of this cage-winding is well known and therefore not further described herein. The downwardly extending bars 10 of the transformer are embedded within the length of the rotor 16 in a ring-shaped member 22 which may likewise be made up from laminated iron. The under ends of the bars 10 are conductively connected with each other by means of a metal ring 23.

The entire apparatus so far described is now placed within an outer jacket or casing 25 having a proper diameter to form a ring-shaped or cylindrical air-gap 24 intermediate the jacket or casing 25 and said apparatus, said air-gap communicating on the one hand with the pump-body 13 and on the other hand with the outlet 26.

The mode of operation of the apparatus hereinabove described will be as follows:

If the primary winding 5 of the transformer is connected to a polyphase alternating current line which, for instance, may be a three-phase line, there will be generated a rotary magnetic field which causes electromotive forces to be induced in the cage-winding 10 which encloses said primary winding. In accordance with the sinusoidal distribution of these electromotive forces the currents flowing in the cage-winding 10 will be of different strength in the several bars of said winding, and more particularly three of said bars which are displaced against each other by 120° will carry a maximum current at a time, while the currents in the remaining bars will approximately follow the sine law. However, by reason of the fact that the rotary field which is generated by the primary winding is continuously rotating, the aforementioned distribution of the currents in the cage-winding 10 will cause a rotary field in the motor, said field rotating in unison with the rotary field in the primary winding. The currents flowing in the bars 10 on the other hand will generate a rotary field which causes electromotive forces to be induced in the cage-winding 21 forming part of the rotor 16 of the motor and in consequence thereof currents flowing within said latter cage-winding. In this manner the secondary winding 10 of the transformer will act simultaneously as the primary winding for the motor.

In contra-distinction to known constructions of the present kind the transformer according to my present invention comprises a cage-winding 10 which is not separated from the primary winding 5 by means of an intermediate wall and the two windings according to my invention are positioned in proximity to each other as close as possible. It will even be possible to embed the bars 10 and the primary winding 5 in one and the same iron-core in which case common slots may be provided for the primary and secondary winding. In the construction shown in Figs. 1 and 2 there are provided two separate laminated core-members 2 and 8 which, however, are closely adjacent to each other without any air-gap therebetween as above mentioned. The copper-bars which are placed into the slots 9 of the outer core 8 in this case will serve simultaneously as fastening wedges for the primary winding placed within the slots 4 on the inner core 2. Moreover, said copper-bars, in addition to this, will serve to effect a secure mechanical connection between the core-members 2 and 8, which is of great importance with regard to the fact that large mechanical forces will be acting between the primary and secondary winding of the transformer. A proper mechanical union between the inner core 2 and the outer core 8, however, may be attained in a manner different from that described herein and shown in the drawings, for instance, by providing narrow air-gaps between the slots of one core-member and the slots of the other.

The construction of the transformer as shown in Figs. 4 and 5 is based on the assumption that the transformer may be used for any desired purpose. The bars 10 are consequently not carried on their underside through the separating plate 15 but are threaded into bushings 27 of metal, said bushings being mounted gastight and watertight into the plate 15 in the manner shown in the drawings. The under ends of the metal bushings 27 may likewise be provided with a thread and bars 100 may be screwed into threads. Instead of these bars, however, it will also be possible to connect flexible leads or cables with the bushings, for instance by means of screws, and to carry said flexible leads or cables to any desired place of use, while connecting the other ends of said leads or cables with a cage-winding as hereinabove described, said cage-winding being adapted to operate as the primary winding either of an induction motor or of an induction furnace. The plate 15 with the bushings 27 therein may in this case be designated as being the switchboard of the transformer.

The separating plate 15 as shown in the construction according to Fig. 4 is kept in position by the intermediary of a tightening ring 28 of rubber or the like, a pressure ring 29 and a threaded nut or ring 30, which latter may be screwed into the jacket 12. For this purpose said ring 30 is provided with bores 31 permitting introduction of a socket wrench or similar implement.

I claim:

1. In a polyphase transformer, especially for supplying electrical energy to motors working under water or to induction furnaces. the combination of a laminated core, a primary winding, a water-tight transformer casing having a plate disposed therein, the periphery of the plate being in contact with the casing wall, and a secondary winding in the form of a cage-winding composed of several bars insulated from each other both of said windings being watertight in said casing and the bars of the secondary winding extending through the plate and being encased, fluid-tight therein a pump motor below the plate and to which the lower ends of the bars are connected.

2. A transformer as specified by claim 1, comprising a cylindrical laminated core composed of an inner and an outer core-member closely adjacent to each other, slots provided on the inner surface of said outer core-member, and slots provided on the outer surface of said inner core-member, said former and said latter slots being positioned to form composite slots common to both of said core-members and adapted for the reception of both, the primary and the secondary winding.

3. A transformer as specified by claim 1, comprising a cylindrical laminated core composed of an inner and an outer core-member closely adjacent to each other, slots provided on the inner surface of said outer core-member, and slots provided on the outer surface of said inner core-member, said former and said latter slots being positioned to form composite slots common to both of said core-members and adapted for the reception of both, the primary and the secondary winding, the bars of said secondary winding being adapted to form wedges for the primary winding within said composite slots to keep both of said windings fixed therein to secure mechanical connection between both of said core-members.

In testimony whereof I affix my signature.

THEODOR POHL.